United States Patent [19]

Rinderer

[11] Patent Number: 4,958,792
[45] Date of Patent: Sep. 25, 1990

[54] CLIP FOR SUPPORTING CONDUIT AND THE LIKE

[75] Inventor: Eric R. Rinderer, Highland, Ill.

[73] Assignee: B-Line Systems, Inc., Highland, Ill.

[21] Appl. No.: 349,254

[22] Filed: May 9, 1989

[51] Int. Cl.$^5$ .............................................. F16L 3/08
[52] U.S. Cl. ...................................... 248/74.2; 24/457
[58] Field of Search .................... 248/74.1, 74.2, 74.3, 248/74.4, 68.1; 24/543, 546, 547, 548, 457, 526; 174/163 R, 164

[56] References Cited

U.S. PATENT DOCUMENTS

| | | | |
|---|---|---|---|
| 3,066,903 | 12/1962 | Tinnerman | 248/74.1 X |
| 3,121,549 | 2/1964 | Loudon | 248/74 |
| 3,143,325 | 8/1964 | Carpenter | 248/68 |
| 3,198,463 | 8/1965 | Loudon | 248/62 |
| 3,276,800 | 10/1966 | Loudon | 287/189.35 |
| 3,310,264 | 3/1967 | Appleton | 248/72 |
| 3,323,766 | 6/1967 | Schauster | 248/62 |
| 3,377,038 | 2/1966 | Loudon | 248/59 |
| 3,501,117 | 3/1970 | Soltysik | 248/71 |
| 3,612,461 | 4/1970 | Brown et al. | 248/317 |
| 3,739,435 | 6/1973 | Baker | 248/74.1 X |
| 4,101,103 | 7/1978 | Mooney et al. | 248/58 |
| 4,157,800 | 6/1979 | Senter et al. | 248/72 |
| 4,360,178 | 11/1982 | Senter | 248/74.1 |
| 4,479,625 | 10/1984 | Martz | 248/74.1 |
| 4,674,720 | 6/1987 | Fetsch | 248/74.1 |
| 4,713,863 | 12/1987 | Jennings | 24/20 R |
| 4,783,029 | 11/1988 | Geppert et al. | 248/74.1 |
| 4,805,856 | 2/1989 | Nicoli | 24/16 PB |
| 4,840,333 | 6/1989 | Nakayama | 248/68.1 |
| 4,840,345 | 6/1989 | Neil | 24/458 X |

OTHER PUBLICATIONS

Author: Thomas Industries, Inc. Title: Suspension Fasteners, Year: 1983, p. 34.
Author: Erico Products, Inc., Title: Caddy ® Newsletter, Year: 1978.

Primary Examiner—J. Franklin Foss
Attorney, Agent, or Firm—Senniger, Powers, Leavitt and Roedel

[57] ABSTRACT

A clip of the present invention is used for supporting conduit and like members. The clip comprises first and second resilient arms for holding a conduit or like member therebetween. The arms have outer end portions bent to extend generally toward one another. The arms are resiliently biased toward a release position in which they are spaced apart and are resiliently movable against this bias to a first support position in which the arms are closer together with their outer end portions in overlapping relation and with the arms in position to embrace a conduit or like member of a first diameter, and from the first support position to a second support position in which the arms are even closer together and in position to embrace a conduit or like member of a smaller diameter. The outer end portion of the first arm has a detent thereon. The outer end portion of the second arm is formed and configured for engagement by the detent to releasably lock the arms in their first and second support positions. Movement of the arms is restricted as they move from their first support position to their second support position so that the detent cannot deviate from a path leading to the stated first and second locations, even if the arms are subjected to forces tending to cause deviation of the detent from the path.

19 Claims, 2 Drawing Sheets

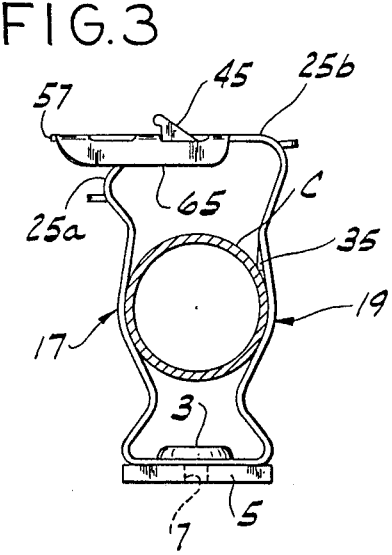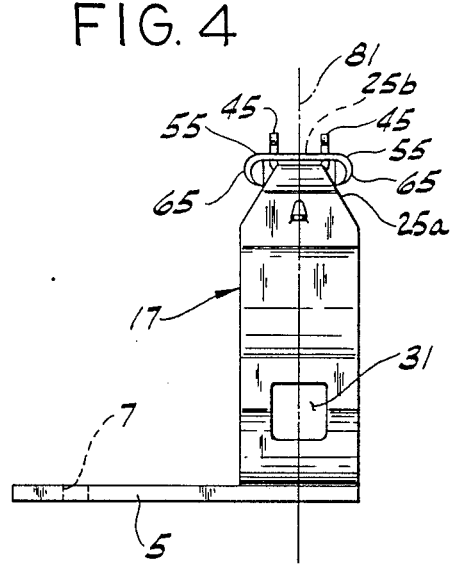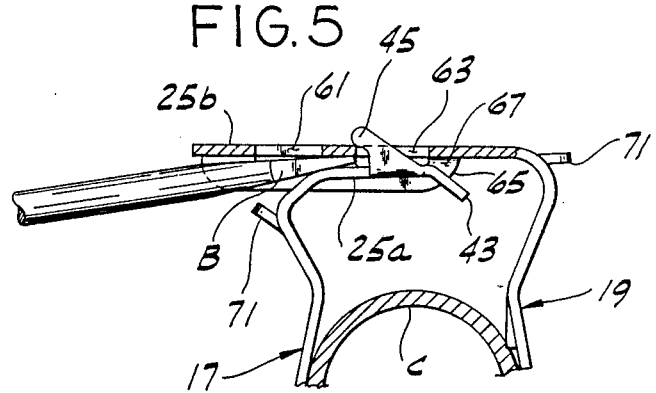

CLIP FOR SUPPORTING CONDUIT AND THE LIKE

BACKGROUND OF THE INVENTION

This invention relates generally to devices for supporting conduit and like members (e.g., pipe), and more particularly to an improved clip for this purpose.

A variety of devices are used in the construction industry to support electrical conduit and like members in position. One such device, manufactured by Erico Products, Inc. of Cleveland, Ohio, is a clip formed from sheet metal to have a base and two arms extending from the base having free end portions bent to extend in overlapping relation. The arms are biased by the natural spring of the sheet metal toward a release position in which they are spaced relatively far apart to permit the insertion of a length of conduit or the like therebetween. Once the conduit has been inserted, the arms are squeezed together by pliers or a similar tool to embrace the conduit. The overlapping free end portions of the arms are formed for snap locking interengagement to hold the arms in a position embracing the conduit. This snap-lock action is accomplished by a single lug on the free end portion of one arm snapping into one of two openings in the free end portion of the other arm, the first opening corresponding to a conduit of one diameter and the second opening corresponding to a conduit of smaller diameter.

The aforementioned clip has several problems associated with it. First, in using pliers to squeeze the arms of the clip together, forces are applied to the clip tending to cause the lug on the free end portion of one arm to miss the appropriate opening in the free end portion of the other arm, and especially the second opening for conduit of smaller diameter. This makes installation of the conduit very difficult, since adjustments have to be made until the lug finally snaps into the appropriate opening. And second, it is difficult to disengage the lug from an opening to release the conduit in the event this becomes necessary.

A similar clip is presently being marketed by Minerallac Electric Company of Addison, Ill. This clip is essentially identical to the clip described above except that the metal of one of the clip arms is upset to form a shallow narrow channel directed away from the first opening toward the second opening. While this channel may serve some slight function of guiding the lug from the first opening toward the second opening, it does not restrict movement of the lug to movement along a path which necessarily leads to the second opening, the result being that the lug may still miss the second opening due to sideways forces applied to the clip by pliers or other tools used to squeeze the arms of the clip together. Moreover, as in the clip made by Erico Products, Inc., removal of the lug from an opening to release the clip arms is difficult.

Accordingly, there is a need in the construction trade for an improved clip which overcomes the aforementioned problems.

SUMMARY OF THE INVENTION

Among the several objects of this invention may be noted the provision of an improved clip of the aforementioned type which provides for quick and ready installation of conduit; the provision of such a clip which is formed so that the lug cannot miss the appropriate opening; the provision of such a clip which is easily released from the conduit in the event this becomes necessary; the provision of such a clip which has a greater holding capacity; and the provision of such a clip which is simple in design for economical manufacture.

Generally, a clip of the present invention is used for supporting conduit and like members. The clip comprises a base and first and second resilient arms extending outwardly from the base for holding a conduit or like member therebetween. The arms have outer end portions bent to extend generally toward one another. The arms are resiliently biased toward a release position in which they are spaced apart and are resiliently movable against said bias to a first support position in which the arms are closer together with their outer end portions in overlapping relation and with the arms in position to embrace a conduit or like member of a first diameter, and from said first support position to a second support position in which the arms are even closer together with their outer end portions in overlapping relation and with the arms in position to embrace a conduit or like member of a second diameter smaller than said first diameter. The outer end portion of the first arm has detent means thereon. The outer end portion of the second arm is formed and configured at a first location for engagement by the detent means to releasably lock the arms in the first support position, and is formed and configured at a second location for engagement by said detent means to releasably lock the arms in the second support position. Means is provided for restricting movement of the arms as they move toward one another from said first support position to said second support position to movement wherein the detent means moves along a path from said first location to said second location. The restricting means is so formed as to prevent the detent means from deviating from this path even if the arms are subjected to forces tending to cause deviation of the detent means from said path.

Other objects and features will be in part apparent and in part pointed out hereinafter.

BRIEF DESCRIPTION OF THE DRAWINGS

FIG. 3 is a view similar to FIG. 2 with the arms of the clip in a second support position for supporting a conduit of a second smaller diameter;

FIG. 4 is a side elevation of the clip shown in FIG. 3; and

FIG. 5 is a partial sectional view illustrating how to release the clip from a conduit.

Corresponding parts are designated by corresponding reference numerals throughout the several views of the drawings.

DESCRIPTION OF THE PREFERRED EMBODIMENT

Figure 1:
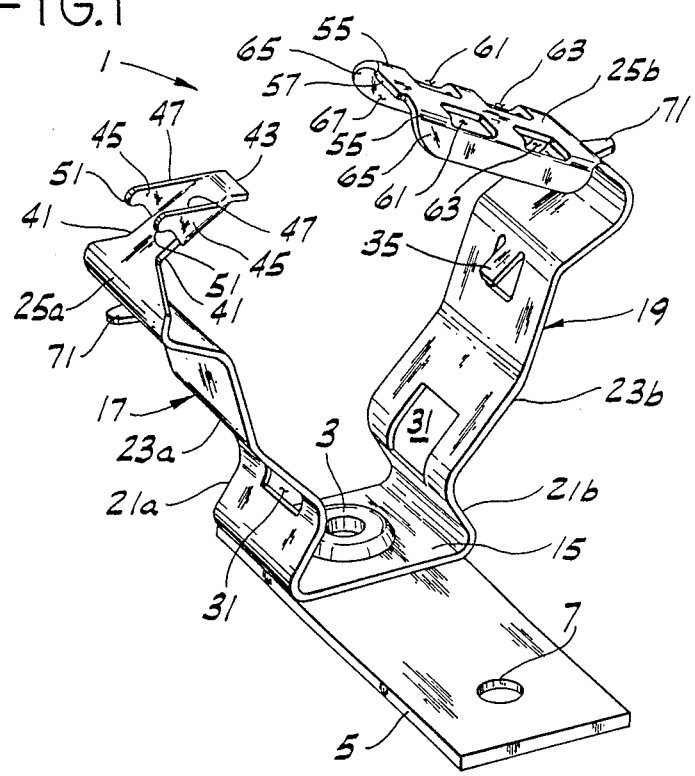
FIG. 1 is a perspective of a clip of the present invention with the arms of the clip in a release position.
Figure 2:
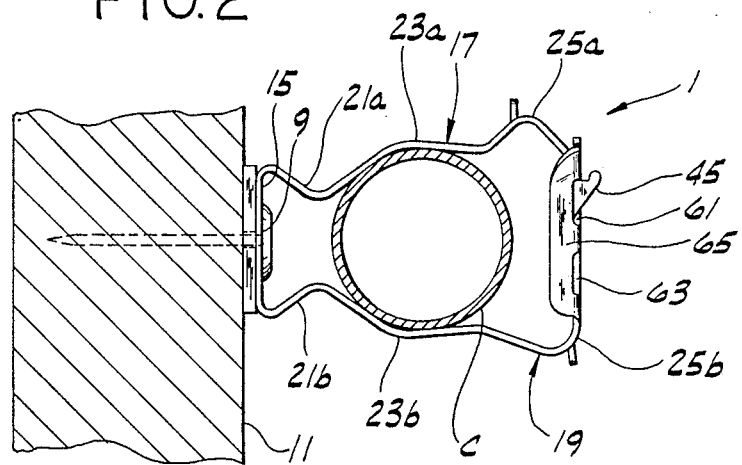
FIG. 2 is an elevation of the clip shown installed on a wall with the arms of the clip in a first support position for supporting a conduit of a first diameter.

Referring now to the drawings, and first more particularly to FIGS. 1 and 2, a clip of the present invention for supporting conduit C and like members (e.g., piping) is designated in its entirety by the reference numeral 1. The clip 1 is adapted for use in conjunction with a variety of devices for securing the clip to an appropriate structural member or the like. For example, as illustrated in FIGS. 1 and 2, the clip is secured by means of a rivet 3 to a rectangular metal bracket plate 5 having a hole 7 at one end for receiving a suitable screw fastener or nail 9 for securement of the clip to a wall 11. It will be understood, of course, that the type of device used to secure the clip 1 in appropriate position may vary without departing from the scope of this invention. Moreover, it is contemplated that the clip may be fastened directly to an appropriate structural member, as will be explained hereinafter.

More specifically, the clip 1 is formed from relatively thin-gage sheet metal heat treated to be resilient and bent to have a relatively flat planar base 15 having a central opening therethrough for receiving the rivet 3. Alternatively, the opening may be used to receive a suitable fastener for fastening the clip directly to a structural member or the like, as mentioned above. Extending outwardly (upwardly as viewed in FIG. 1) from the base 15 are first and second resilient arms generally designated 17 and 19, respectively. Each arm has a lower portion 21a, 21b bent to slope outwardly away from the base 15 and toward the other arm, a central portion 23a, 23b which is bent to slope outwardly and generally away from the other arm, and an outer (upper) free end portion 25a, 25b which extends laterally from the arm generally at right angles to the arm toward the outer free end portion of the other arm. The central portion 23a, 23b of each arm 17, 19 is configured in the shape of a shallow V to more closely correspond to the circular contour of the conduit C when the latter is inserted to a position between the arms of the clip.

A rectangular opening or window 31 is provided in the central portion 23a, 23b of each arm 17, 19 toward the inner (lower) end of the central portion to facilitate resilient movement of the arms from a release position (FIG. 1) in which the arms are spaced relatively far apart to a first support position (FIG. 2) in which the arms are closer together with their outer free end portions 25a, 25b in overlapping generally parallel relation and with the arms in position to embrace a conduit C or like member of a first diameter (e.g., ¾ in.), and further to a second support position (FIG. 3) in which the arms are even closer together with their outer end portions in overlapping generally parallel relation and with the arms in position for embracing a conduit C or like member of a second diameter (e.g., ½ in.) smaller than the stated first diameter. When the arms 17, 19 are in either of their stated support positions, they are shaped and configured to exert a clamping force on the conduit C sufficient to hold the conduit in fixed axial position relative to the clip. A small tab 35 struck from the right arm 19 of the clip 1 (as viewed in FIG. 3) is adapted to bite into the conduit to assist in holding the conduit fixed with respect to the clip, especially a conduit of smaller size.

As will now be described, the outer end portions 25a, 25b of the two resilient arms 17, 19 are formed for snap-lock interengagement for releasably locking the arms in the aforementioned first (FIG. 2) and second (FIG. 3) support positions. It will be observed in this regard that the outer end portion 25a, 25b of the left arm 17 (as viewed in FIG. 1) is substantially narrower than the central and lower portions 23a, 21a of the arm. This relatively narrow outer end portion 25a has opposite side edges, designated 41, and terminates in an outer end designated 43. Detent means comprising a pair of generally parallel lugs 45 are bent up from opposite sides edges 41 adjacent the outer end of the arm. Each lug 45 has a leading edge 47 sloping up and away from the outer end 43 toward a hook-shaped formation 51 at the top of the lug. The outer end portion of the other (right) arm 19 is only slightly narrower than the central and lower portions 23b, 21b of the arm, having opposite side edges 55 and a outer free end designated 57. Two pairs of side-by-side openings are spaced endwise of the outer end portion 25b of the left arm 19, the two openings of the first pair (constituting first aperture means) each being designated 61 and being at a first location spaced relatively closely to the outer end 57 of the arm, and the two openings of the second pair (constituting second aperture means) each being designated 63 and being at a second location spaced from the first pair of openings 61. A pair of guide members or flanges or walls 65 are bent down from opposite side edges 55 of the right arm 19 (FIG. 1) and define a guideway 67 therebetween for receiving the outer end portion 25a of the left arm 17. The guide flanges 65 are flared away from one another at the outer end of the arm 19 to facilitate entry of the outer end portion 25a of the other arm 17 into the guideway 67. To further facilitate such entry, the free end 43 of arm 17 is turned down to avoid striking the free end 57 of arm 19 when the arms are squeezed together.

In accordance with this invention, the two lugs 45 on the left arm 17 (as viewed in FIG. 1) are adapted resiliently to snap into the first pair of openings 61 when the arms 17, 19 are squeezed together to their first support position to support a conduit C of the stated first diameter (see FIG. 2), and are adapted resiliently to snap into the second pair of openings 63 when the arms are squeezed together to their second support position to support a conduit C of the stated second diameter (see FIG. 3). The arms 17, 19 are typically squeezed together by means of pliers (channel locks) having a pair of pivoting jaws. To facilitate this process, tabs 71 are struck from the outer ends of the central portions 23a, 23b of the two arms 17, 19 to enable the pliers jaws more securely to grip the arms of the clip.

In use, the clip 1 is simple to install on a conduit C. After securing the clip to a suitable structural member or the like, and with the arms 17, 19 of the clip in their release (FIG. 1) position, a length of conduit is inserted between the arms. A suitable tool is then used to squeeze the arms closed. As the arms 17, 19 are squeezed together, the outer end portion 25a of the arm 17 having the two lugs 45 thereon will move into the guideway 67 defined by the guide flanges 65 on the other arm 19. As the sloped leading edges 47 of the two lugs 45 engage the outer end 57 of arm 19, they serve as camming means to deflect the outer end portion 25a of arm 17 resiliently downwardly. The outer end portion 25a remains in this deflected state until the lugs move into registry with the first pair of openings 61 and snap upwardly into the openings to secure the arms in the stated first support position (FIG. 2). With the arms in this position, a conduit of the aforementioned larger size is securely held in position. If the conduit is of smaller size, the arms 17, 19 of the clip are squeezed closer together to move the lugs 45 toward the second pair of openings 63. As the lugs move in this direction, their sloped leading edges 47 (constituting camera means) engage the edges of the first pair of openings 63 to resiliently deflect the outer end portion 25a of arm 17 downwardly, thereby enabling the lugs 45 to move smoothly out of the first pair of openings 61 and into the second pair of openings 63 to lock the arms 17, 19 in their stated second position (FIG. 3) securely clamping the smaller conduit therebetween.

It is important to note that, as the outer end portion 25a of arm 17 moves in the guideway 67 toward the first and second pairs of openings 61, 63, the guide flanges 65 restrict movement of the outer end portion to movement along a path (i.e., along the guideway 67) wherein the lugs 45 move first into registry with the first pair of openings 61 and, if desired, then into registry with the second pair of openings 63. The guide flanges 65 prevent the lugs 45 from deviating from this path even if the arms 17, 19 are subjected to forces tending to cause deviation of the lugs. This is very important because when pliers or the like are used to install the clip, the jaws of the pliers traverse an arcuate path, not a linear one, which tends to cause the overlapping outer end portions 25a, 25b of the arms 17, 19 to move sideways relative to One anOther rather than endwise. Without the guide flanges 65, this sideways movement would result in the outer end portions 25a, 25b becoming misaligned and the lugs 45 missing the appropriate pair of openings 61, 63, particularly the second pair of openings 63. This has been a serious problem in installing prior clips. The clip of the present invention avoids this problem by using means (the guide flanges 65) for restricting movement of the arms 17, 19 to movement in a single plane (the central vertical plane designated 81 in FIG. 4) so that the outer end portions 25a, 25b of the arms remain aligned as the arms move toward their stated first and second support positions. The result is that the lugs 45 are positively guided along a path in which they cannot miss the appropriate pair of openings no matter how great the forces tending to cause deviation from this path.

The fact that the clip 1 has two lugs 45 rather than only one also substantially increases the holding strength or capacity of the clip.

Release of the clip 1 from a conduit C is quickly and easily accomplished. As illustrated in FIG. 5, the blade B of a screwdriver or other tool is simply inserted into the guideway 67 between the overlapping end portions 25a, 25b of the arms 17, 19 and then twisted on the axis of the shank of the screwdriver to force the end portions apart, whereupon the resilience of the arms 17, 19 will cause them to spring back to their release position.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. A clip for supporting conduit and like members, comprising a base and first and second resilient arms extending outwardly from the base for holding a conduit or like member therebetween, said arms having outer end portions bent to extend generally toward one another, said arms being resiliently biased toward a release position in which they are spaced apart and being resiliently movable against said bias to a first support position in which the arms are closer together with their outer end portions in overlapping relation and with the arms in position to embrace a conduit or like member of a first diameter, and from said first support position to a second support position in which the arms are even closer together with their outer end portions in overlapping relation and with the arms in position to embrace a conduit or like member of a second diameter smaller than said first diameter, the outer end portion of said first arm having detent means thereon, the outer end portion of the second arm being formed and configured at a first location for engagement by said detent means to releasably lock the arms in said first support position and formed and configured at a second location for engagement by said detent means to releasably lock the arms in said second support position, and means for restricting movement of the arms as they move toward one another from said first support position to said second support position to movement wherein said detent means moves along a path from said first location to said second location, said restricting means being so formed as to prevent said detent means from deviating from said path even if the arms are subjected to forces tending to cause deviation of said detent means from said path.

2. A clip as set forth in claim 1 wherein said detent means includes camming means engageable with the outer end portion of the second arm for resiliently camming the outer end portions of the two arms away from one another as the arms are squeezed together toward said first and second support positions, said outer end portions being adapted to snap toward one another as said detent means engages the outer end portion of the second arm at said first and second locations.

3. A clip as set forth in claim 1 further comprising first aperture means and second aperture means spaced endwise of the outer end portion of the second arm, said detent means being receivable in said first aperture means for locking the arms in said first support position and in said second aperture means for locking the arms in said second support position.

4. A clip as set forth in claim 3 wherein said detent means comprises a pair of lugs adjacent opposite sides of the outer end portion of the first arm.

5. A clip as set forth in claim 4 wherein said lugs have sloped edges engageable with the outer end portion of the second arm for resiliently camming the outer end portions of the two arms away from one another as the arms are squeezed together toward said first and second support positions.

6. A clip as set forth in claim 4 wherein said first aperture means comprises a first pair of openings in the free end portion of the second arm for receiving said pair of lugs to lock said arms in said first support position, and said second aperture means comprises a second pair of openings in the free end portion of the second arm for receiving said pair of lugs to lock said arms in said second support position.

7. A clip as set forth in claim 6 wherein the openings of said first pair of openings are positioned side-by-side and the openings of said second pair of openings are positioned side-by-side.

8. A clip as set forth in claim 1 wherein said restricting means comprises a pair of guide members along opposite sides of the free end portion of said second arm defining a guideway therebetween for the free end portion of said first arm and said detent means thereon.

9. A clip as set forth in claim 8 wherein said guide members extend from adjacent an outer end of said second arm inward along the outer end portion of the arm past said first location to a point beyond said second location.

10. A clip as set forth in claim 9 wherein said guide members are flared away from one another at the outer end of the outer end portion of the second arm to facilitate entry of the outer end portion of the first arm into said guideway.

11. A clip as set forth in claim 4 wherein the end portions of the first and second arms are configured to allow a tool to be inserted between the overlapping end portions, and wherein the lugs and the aperture means are configured to release when the tool is manipulated to urge the end portions apart.

12. A clip for supporting conduit and like members, comprising a base and first and second resilient arms extending outwardly from the base for holding a conduit or like member therebetween, said arms having outer end portions bent to extend generally toward one another, the arms being resiliently biased toward a release position in which they are spaced apart and being resiliently movable against said bias to a first support position in which the arms are closer together with their outer end portions in overlapping relation, the second arm overlapping the first arm, with the arms in position to embrace a conduit or like member of a first diameter, and from said first support position to a second support position in which the arms are even closer together with their outer end portions in overlapping relation, with the second arm overlapping the first arm and with the arms in position to embrace a conduit or like member of a second diameter smaller than said first diameter, the outer end portion of said first arm having at least one lug projecting upwardly therefrom, the outer end portion of the second arm having first aperture means therein at a first location for receiving and engaging the lug to releasably lock the arms in said first support position and having second aperture means therein at a second location for receiving and engaging the lug to releasably lock the arms in said second support position, and guide means comprising depending sidewalls on the second end portion for receiving the first end portion therebetween and guiding the movement of the first arm as it moves from the first support position to the second support position, so that the lug moves along a path from said first location to said second location without deviating from said path even if the arms are subjected to forces tending to cause deviation of the lugs from the path.

13. A clip as set forth in claim 12 wherein there are a pair of lugs, adjacent opposite sides of the outer portion of the first arm.

14. A clip as set forth in claim 13 wherein the lugs have sloped edges engageable with the outer end portion of the second arm for resiliently camming the outer end portions of the two arms away from one another as the arms are squeezed together toward the first and second support positions.

15. A clip as set forth in claim 12 wherein the first aperture means comprises a first pair of openings in the free end portion of the second arm for receiving the pair of lugs to lock the arms in the first support position, and the second aperture means comprises a second pair of openings in the free end portion of the second arm for receiving the pair of lugs to lock the arms in the second support position.

16. A clip as set forth in claim 15 wherein the openings of the first pair of openings are positioned side-by-side, and the openings of the second pair are positioned side-by-side.

17. A clip as set forth in claim 12 wherein the depending walls extend from adjacent an outer end of the second arm inward along the outer end portion of the arm past said first location to a point beyond said second location.

18. A clip as set forth in claim 17 wherein the depending walls are flared away from one another at the outer end of the outer portion of the second arm to facilitate entry of the outer end portion of the first arm between the walls.

19. A clip as set forth in claim 12 wherein the end portions of the first and second arms are configured to allow a tool to be inserted between the overlapping end portions, and wherein the lugs and the aperture means are configured to release when the tool is manipulated to urge the end portions apart.

* * * * *